United States Patent
Chen

(10) Patent No.: US 11,000,955 B2
(45) Date of Patent: *May 11, 2021

(54) MOBILE PHONE ROBOT

(71) Applicant: Song Chen, Livermore, CA (US)

(72) Inventor: Song Chen, Livermore, CA (US)

(73) Assignee: AIPPS, LLC., Phoenix, AZ (US)

( * ) Notice: Subject to any disclaimer, the term of this patent is extended or adjusted under 35 U.S.C. 154(b) by 331 days.

This patent is subject to a terminal disclaimer.

(21) Appl. No.: 16/157,043

(22) Filed: Oct. 10, 2018

(65) Prior Publication Data

US 2020/0114522 A1   Apr. 16, 2020

(51) Int. Cl.
  *B25J 13/00* (2006.01)
  *G06T 1/00* (2006.01)
  *B25J 9/16* (2006.01)

(52) U.S. Cl.
  CPC .......... *B25J 13/006* (2013.01); *B25J 9/1664* (2013.01); *B25J 9/1697* (2013.01); *B25J 13/003* (2013.01); *G06T 1/0014* (2013.01)

(58) Field of Classification Search
  CPC ...... B25J 13/006; B25J 9/1664; B25J 9/1697; B25J 13/003; G06T 1/0014
  See application file for complete search history.

(56) References Cited

U.S. PATENT DOCUMENTS

| | | | |
|---|---|---|---|
| 8,552,983 B2 | 10/2013 | Chiu | |
| 9,873,200 B2 | 1/2018 | Song et al. | |
| 9,962,838 B2 | 5/2018 | Seong | |
| 10,525,599 B1* | 1/2020 | Zutshi | B25J 9/1697 |
| 10,766,143 B1* | 9/2020 | Liu | B25J 9/1697 |
| 2006/0229108 A1 | 10/2006 | Cehelnik | |
| 2013/0345864 A1* | 12/2013 | Park | B25J 9/1682 700/248 |
| 2014/0309775 A1* | 10/2014 | Jenkinson | B25J 9/02 700/250 |
| 2015/0336276 A1* | 11/2015 | Song | B25J 13/088 700/253 |
| 2017/0013950 A1 | 1/2017 | Rieger | |
| 2017/0116986 A1 | 4/2017 | Weng et al. | |
| 2017/0252923 A1 | 9/2017 | Esnard-Domerego | |
| 2018/0316443 A1* | 11/2018 | Diperna | H04B 17/29 |

* cited by examiner

*Primary Examiner* — Jeff A Burke
*Assistant Examiner* — Joshua Alexander Garza
(74) *Attorney, Agent, or Firm* — Douglas L. Weller

(57) ABSTRACT

A mobile phone robot is able to perform multi-touch operations on a mobile phone. A fastener holds a mobile phone stationary relative to the mobile phone robot. A first robot arm subsystem controls location and timing of contact of a first stylus tip with a touchscreen or a keyboard of the mobile phone. A second robot arm subsystem controls location and timing of contact of a first stylus tip with a touchscreen or a keyboard of the mobile phone. A camera subsystem is oriented to capture images displayed by the mobile phone. Control circuitry controls the first robot arm subsystem and the second robot arm subsystem. The control circuitry processes the images captured by the camera subsystem to detect text displayed within the image and to detect layout of the image. The control circuitry performs speech to text translation to receive commands from a user to perform multi-operations touch that are performed by the first robot arm subsystem and the second robot arm subsystem.

19 Claims, 7 Drawing Sheets

MOBILE PHONE ROBOT

BACKGROUND

Smartphones are useful and productive tools to accomplish a wide variety of tasks. There are times, however, when utilizing a smartphone phone "hands free" is useful or necessary. For example, many jurisdictions allow only hands-free use of mobile phones when driving. Some people may have limited use of their hands because of injury and handicap.

DETAILED DESCRIPTION

Figure 1:
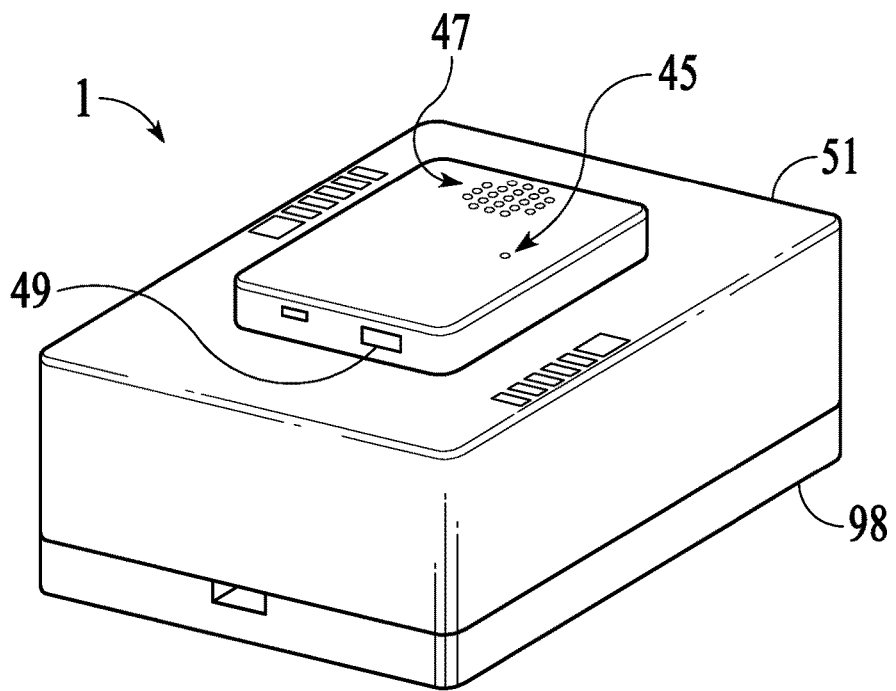
FIG. 1 shows an enclosure for a mobile phone robot in accordance with an implementation.

FIG. 1 shows a mobile phone robot that has an upper body 51 and a lower body 98 that together create an enclosure that holds a mobile phone inside and operates the mobile phone. Upper body 51 includes a fixed chamber 1 that has a smart camera subsystem fixed inside. Chamber 1 has openings to accommodate attachment and communication. For example, the openings include a USB slot 49, a microphone opening 45 and a speaker opening 47. USB slot 49 is used to attach a USB cable that includes a power supply that provides power to the mobile phone robot. A microphone opening 45 allows a microphone integrated within the mobile phone robot to pick up voice input and detect other sounds. Speaker opening 47 allows a speaker integrated within the mobile phone robot to broadcast a synthesized voice and other sounds.

Figure 2:
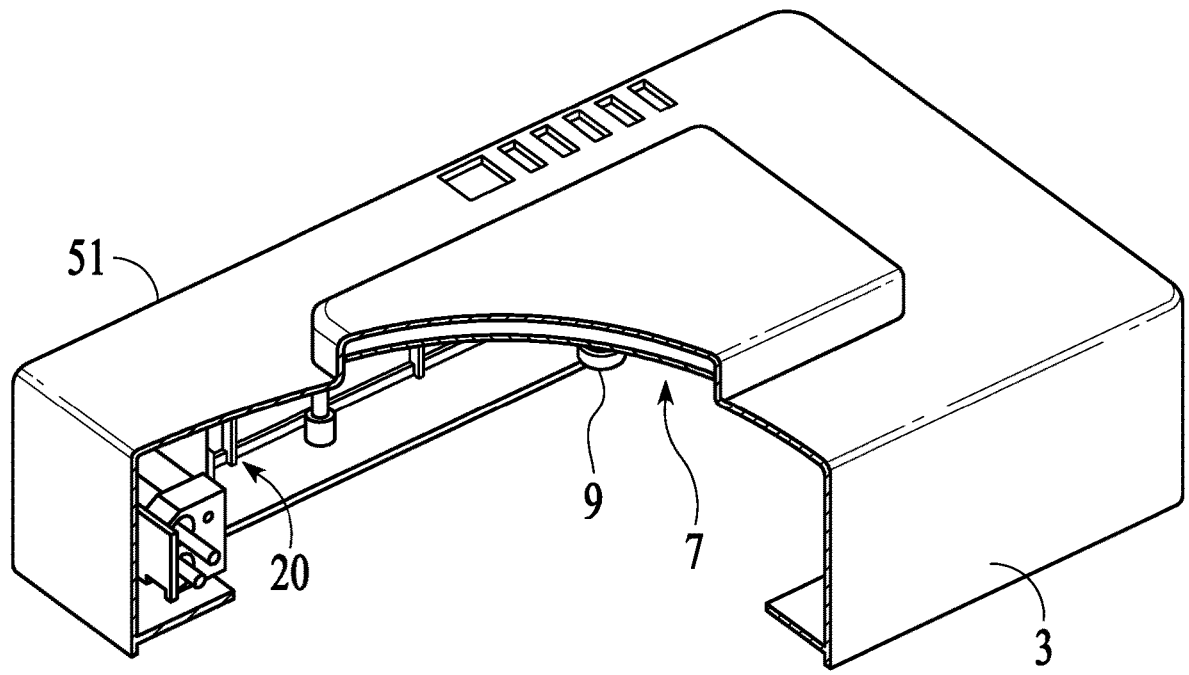
FIG. 2 shows a cut-away view of an upper body for a mobile phone robot in accordance with an implementation.

FIG. 2 shows a sectional view of an exemplary construction of upper body 51. Upper body 51 has an outer enclosure 3. A smart camera system fixed inside upper body 51 includes a camera lens module 9. Upper body 51 also has robot arm subsystems 20 embedded inside.

A main electronics circuit board 7 includes integrated circuits electronic components that implements a controller that running software controls operation of the mobile phone robot. The integrated circuits electronic components include one or more processors and data storage. Additionally, integrated circuits electronic components include audio technology to control a speaker and microphone incorporated as part of the mobile phone robot. The integrated circuitry components also include, for example, wireless communication technology such as Bluetooth technology, Wi-Fi technology and/or 4G/5G wireless data technology.

Figure 3:
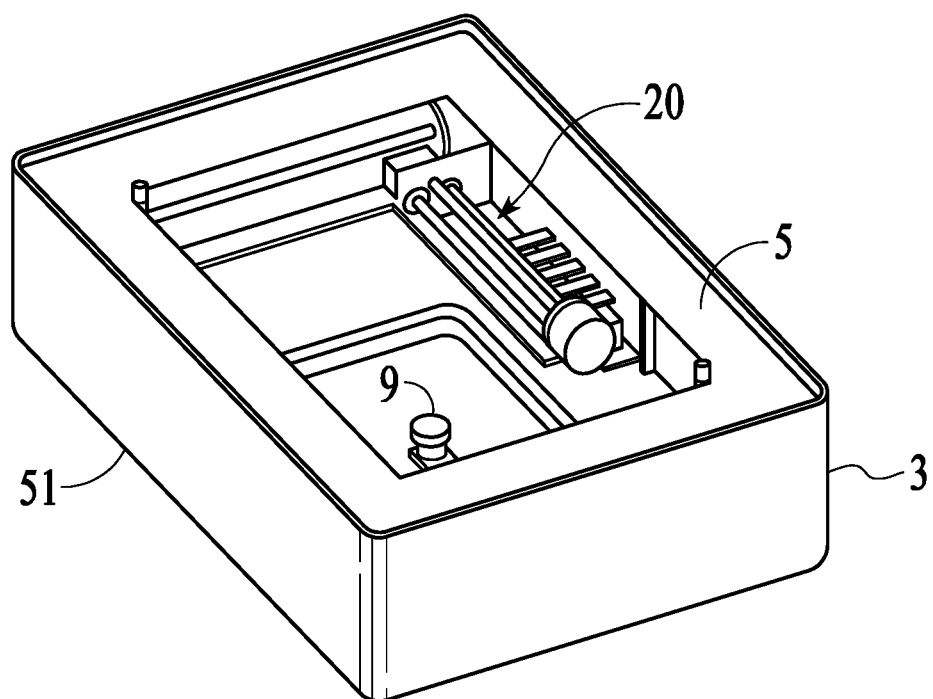
FIG. 3 and FIG. 4 show additional detail of an upper body of a mobile phone robot in accordance with an implementation.

FIG. 3 shows another view of upper body 51. Robot arm subsystems 20 are shown. Also shown is a plastic ring structure 5 for fixing and supporting a smart camera subsystem.

Figure 4:
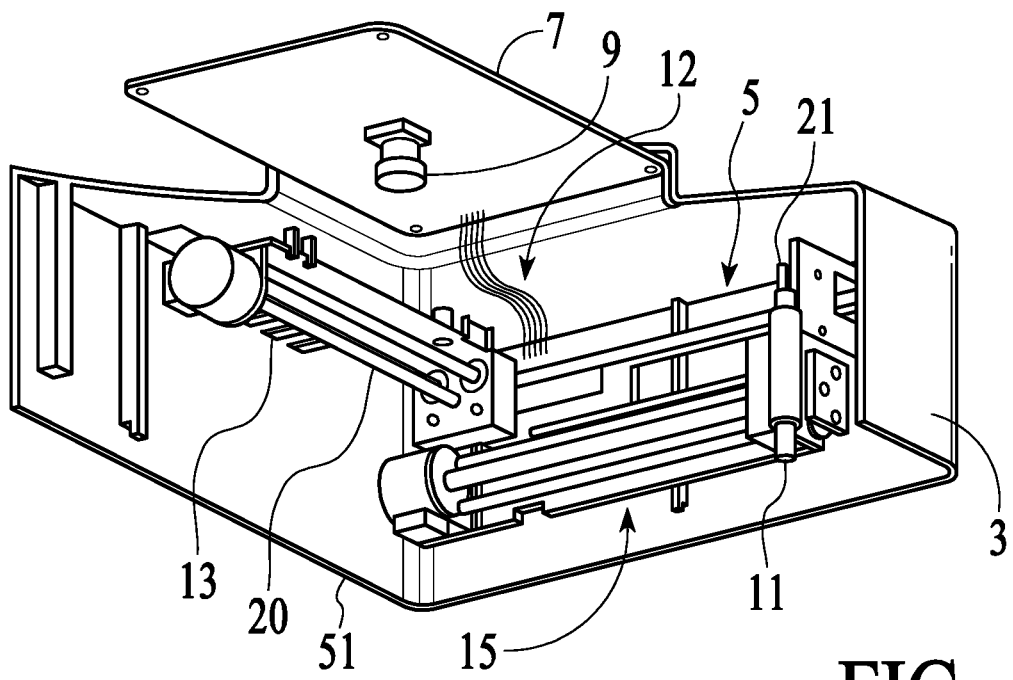

FIG. 4 shows a bottom-up view of upper body 51, which reveals more details of the inside structure of upper body 51. The smart camera subsystem is shown to include camera lens module 9 mounted on main electronics circuit board 7. Robot arm subsystems 20 are fixed to the sidewall of upper body 51 and plastic ring structure 5.

FIG. 4 shows robot arm subsystem 20 includes a robot arm 13, a robot arm 15 and a robot arm 11. Robot arm 13 is located along a direction corresponding to the long side of a mobile phone mounted within the mobile phone robot. Robot arm 15 is located along a direction corresponding to the short side of a mobile phone mounted within the mobile phone robot. Robot arm 11 is located along a direction corresponding to a face of a mobile phone mounted within the mobile phone robot. Controlling electronics for robot arm subsystem 20 are included on main electronics circuit board 7. Cables 12 are connected between main electronics circuit board 7 and robot arm subsystem 20. Control signals from main electronics circuit board 7 are sent to robot arm subsystem 20 via cables 12. Software running on circuitry within main electronics circuit board 7 provide the control signals.

Figure 5:
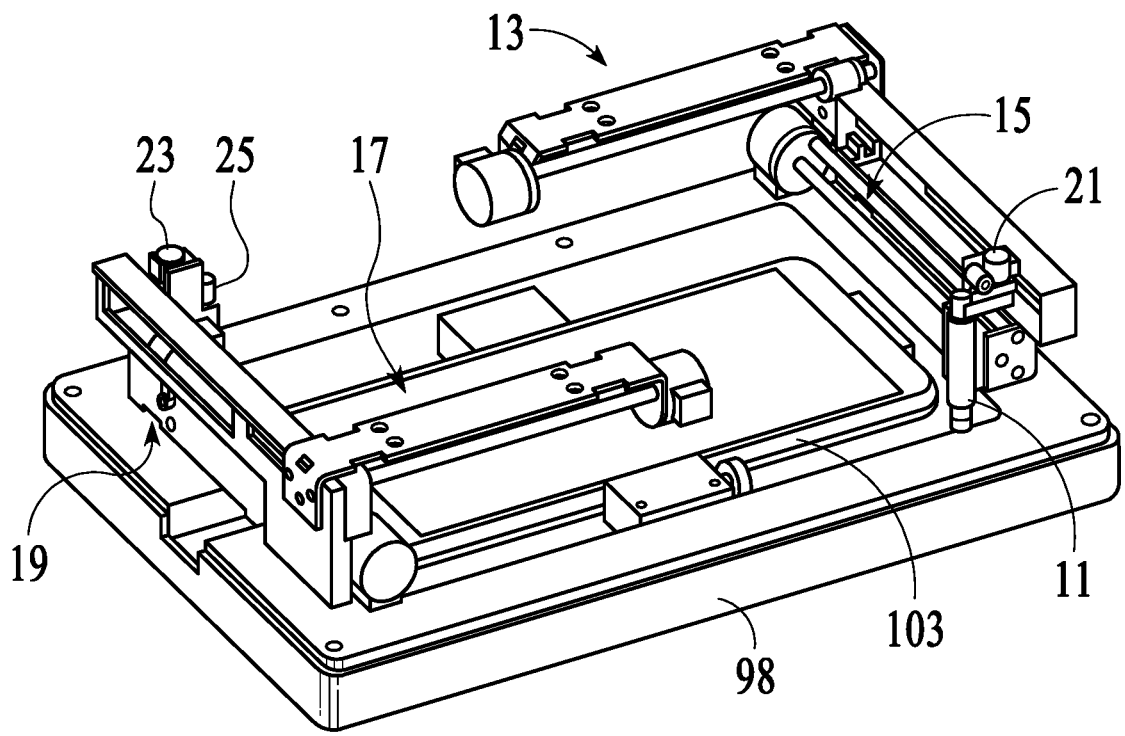
FIG. 5 and FIG. 6 show details of robot arm subsystems able to perform multi-touch operations on a touchscreen or a keyboard of a mobile phone, in accordance with an implementation

FIG. 5 shows upper body 51 located on lower body 98. Also shown are two independently operated robot arm subsystems of robot arm subsystems 20. The first robot arm subsystem of robot arm subsystems 20 contains robot arm 13, robot arm 15 and robot arm 21. A stylus tip 11 is attached to robot arm 21. Robot arm 13, robot arm 15 and robot arm 11 control a location of stylus tip 11 with respect to a touchscreen display or keyboard of a mobile phone. Control motors within stylus tip 11 control motion toward and away from the touchscreen display or keyboard of a mobile phone mounted with the mobile phone robot. These control motors control contact between stylus tip 11 and the touchscreen display or keyboard of the mobile phone.

The second robot arm subsystem of robot arm subsystems 20 contains a robot arm 17, a robot arm 19 and a robot arm 25. A stylus tip 25 is attached to robot arm 21. Robot arm 17, robot arm 19 and robot arm 25 control a location of stylus tip 23 with respect to the touchscreen display or keyboard of a mobile phone. Control motors within stylus tip 25 control motion toward and away from the touchscreen display or keyboard of the mobile phone. These control motors control contact between stylus tip 23 and the touchscreen display or keyboard of the mobile phone.

Under the direction of software running on main electronics circuit board 7, robot arm subsystems 20 allow multi-touch operation of the touchscreen display or keyboard of the mobile phone similar to performance by fingers of a human hand. What is meant by multi-touch operations is where a touchscreen or a keyboard simultaneously recognizes more than one point of contact with the touchscreen or the keyboard. Multi-touch operation is implemented, for example, by stylus tip 11 and stylus tip 25 simultaneously being used to contact a touchscreen or a keyboard of a mobile phone.

Figure 6:
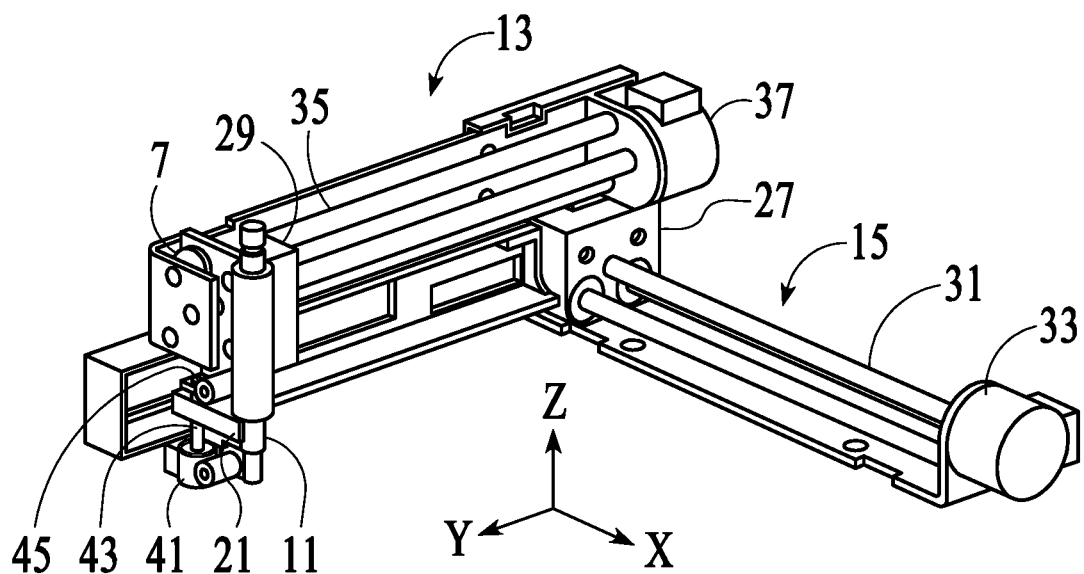

For example, each robot arm includes a driving motor, a lead screw, and a lead nut. This is illustrated in FIG. 6 where robot arm 13 is shown to include a lead screw 35, a driving motor 37, and a lead nut 29. Also, robot arm 15 is shown to include a lead screw 31, a driving motor 33, and a lead nut 27. Likewise, robot arm 21 is shown to include a lead screw 43, a driving motor 41, and a lead nut 45.

Figure 7:
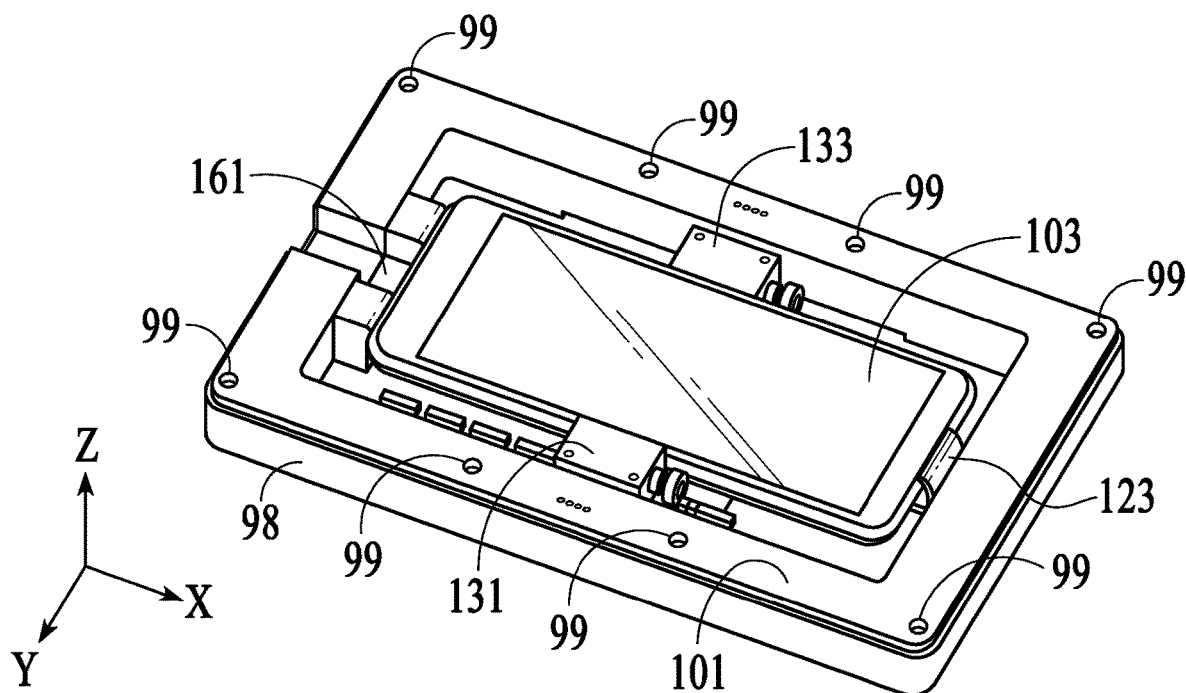
FIG. 7 and FIG. 8 show detail of a lower body of a mobile phone robot in accordance with an implementation.

FIG. 7 shows an exemplary construction of the lower body 98. Lower body 98 includes a moveable buckle clamp 123, a support structure 131, a support structure 133 and a clamp support structure 161 to clamp a mobile phone 103 firmly within lower body 98. For example, as shown, mobile phone 103 is a smartphone with a full length touchscreen display. A side ring 101 serves as a seal ring. Magnets 99 are embedded into side ring 101 to fix upper body 51 tightly on top of lower body 98 to form a rigid overall enclosure and structure. The magnetic bonds formed by Magnets 99 with ferromagnetic material at matching locations on upper body 51 ensure that upper body 51 is held securely and tightly on top of lower body 98 even when mobile phone robot is located within a moving vehicle. As will be understood by persons of the art, using clamps as described above is only one example. There are various ways to attach a mobile phone within a mobile phone robot including belts, screws, compressed springs, and other types of fasteners.

Figure 8:
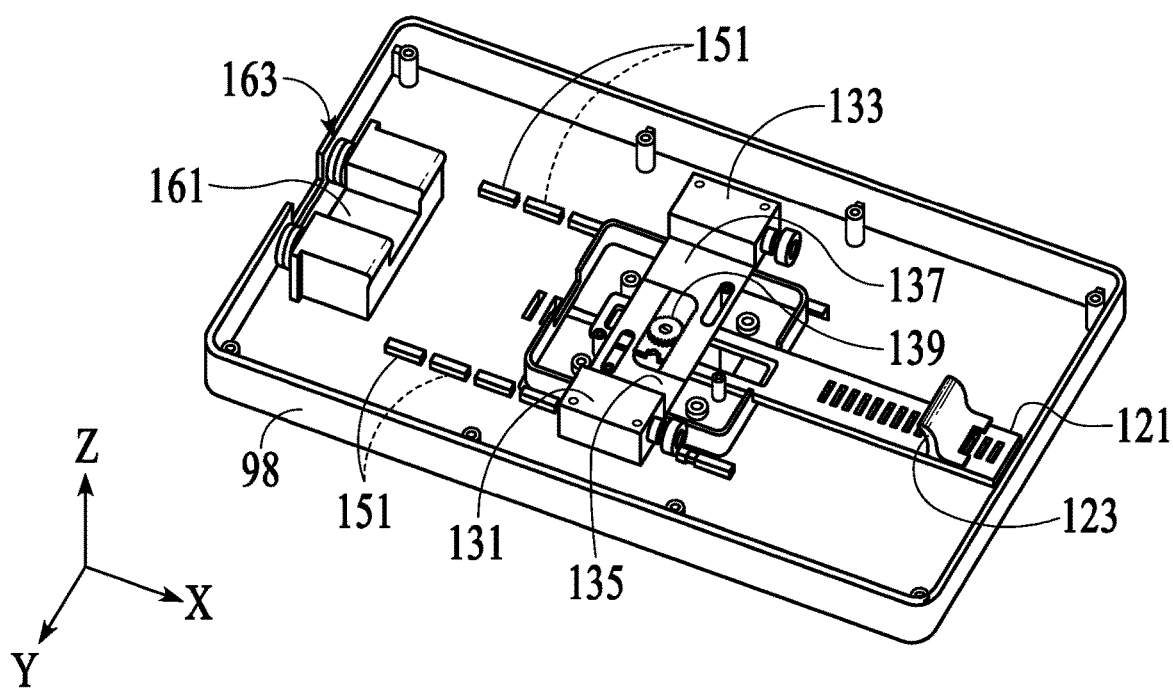

FIG. 8 shows lower body 98 with mobile phone 103 removed. Clamp support structure 161 is connected to an inner side wall of the lower body enclosure via springs 163. Springs 163 supply force to the lower side of mobile phone 103 to hold a mobile phone securely in place. Opposite clamp support structure 161 is movable buckle clamp 123 that can be fixed in location by one of the slots along a scale structure 121. The lots within scale structure 121 allow the distance between moveable buckle clamp 123 and clamp support structure 161 to be varied to fit mobile phones of different sizes. Instead of movable buckle clamp 123, other types of holding devices may be used to adjust the position of the mobile phone. These holding devices may include springs, moldable material, hooks, screws or other features, as will be understood by persons in the art.

The clamp structure formed by movable buckle clamp 123 and clamp support structure 161 holds a mobile phone securely in a long side direction. Another clamp structured is formed by a clamping piece 135 and a clamping piece 137. Clamping piece 135 and clamping piece 137 are each shaped as an L-shaped pad. Either or both of clamping piece 135 and clamping piece 137 may include gear teeth.

Clamping piece 135 and clamping piece 137 are joined by a gear 139 attached to a supporting tray 141. A motor 131 is attached to clamping piece 135 and a motor 133 is attached to clamping piece 137. A user can pull or push motor 131 and motor 133 to make clamping piece 135 and clamping piece 137 snugly hold a mobile phone along the short direction of the mobile phone. Motor 131 and motor 133 can be used to press side buttons on a mobile phone. Additional motors can be added if there is a need to press buttons on other sides (e.g., the lower side or the upper side) of the mobile phone.

Slots 151 are used to hold bottom of tray 141 at a desired location relative to side buttons of a mobile phone. A pair of buckle structures attach tray 141 at a desired slot location. Selecting the correct slot location allows tray 141 to be situated so that motor 131 and motor 133 are configured to be in position to press buttons on either side of a mobile phone. Instead of slots 151, other types of location adjusters can be used. Such location adjusters can include, for example, springs, moldable material, hooks, screws or other features, as will be understood by persons in the art.

Figure 9:
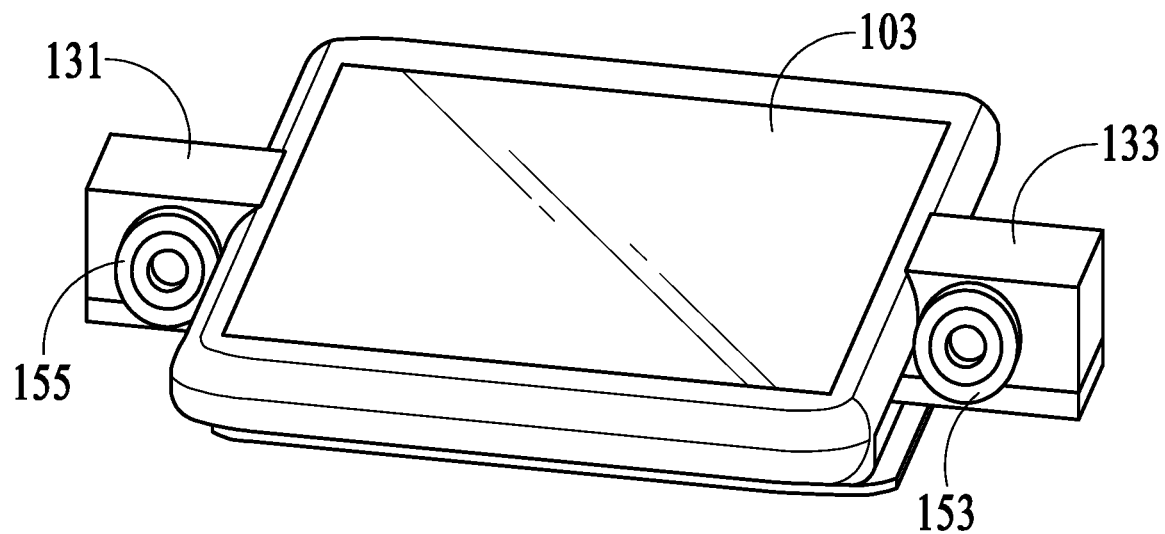
FIG. 9 and FIG. 10 illustrates attachment of a mobile phone robot to a mobile phone in accordance with an implementation.

FIG. 9 shows an elliptical sectional shaped cylinder 155 attached to a rotating shaft driven by motor 131. When motor 131 rotates the shaft, an outer surface of elliptical sectional shaped cylinder 155 will cause push and release a button located adjacent to elliptical sectional shaped cylinder 155. Likewise, an elliptical sectional shaped cylinder 153 is attached to a rotating shaft driven by motor 133. When motor 133 rotates the shaft, an outer surface of elliptical sectional shaped cylinder 153 will cause push and release a button located adjacent to elliptical sectional shaped cylinder 153. Other types of button pushing technology may be used instead of elliptical sectional shaped cylinder 153 and elliptical sectional shaped cylinder 155. For example, these can include piston-type devices, devices formed by a linkage, hydraulic devices, solenoid-type devices and so on.

Figure 10:
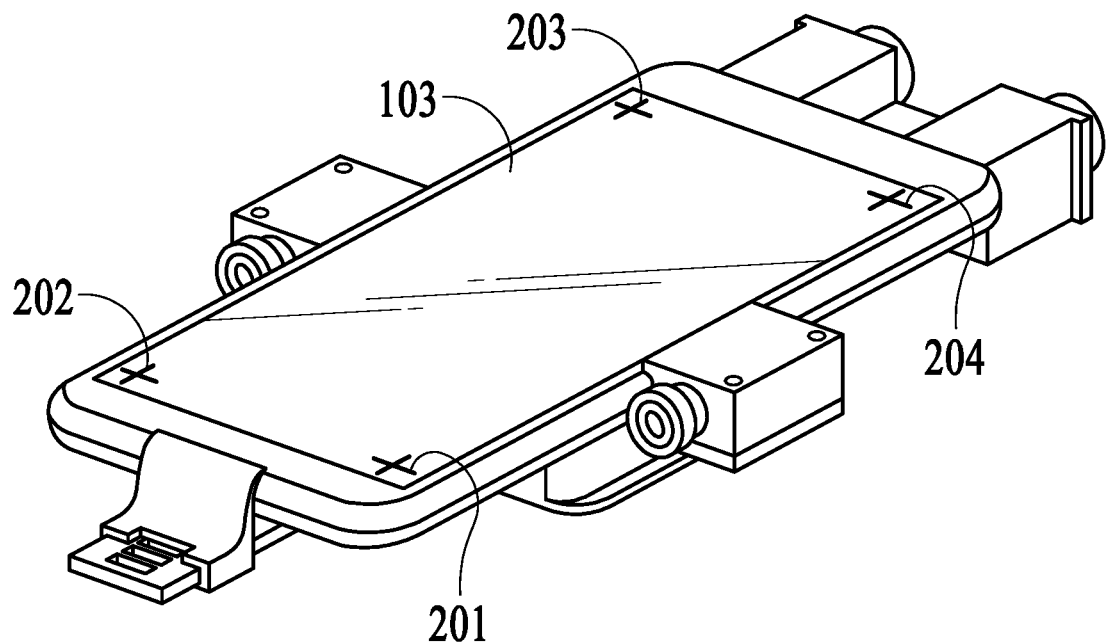

FIG. 10 illustrates an image that appears on the touchscreen display screen of mobile phone 103 during an exemplary calibration process. For example, the image has a simple white background with a black cross shape 201, black cross shape 202, black cross shape 203 and black cross shape 204, each displayed at one of the four corners of the touchscreen display of mobile phone 103. Robot arm subsystems 20 move so that each black cross shape is touched by stylus tip 11 and/or stylus tip 25. The operation is monitored by a robot arm controller implemented by software running on circuitry within main electronics circuit board 21 using camera lens module 9 of the mobile display monitoring camera system. For example, robot arm controller will guide stylus 11 or stylus 25 to an exact location to touch the center of the cross by a series of approximation and adjustment steps. Stylus tip 11 and stylus tip 25 can be pointed and hard for precise contact with a touchscreen or a keyboard, or stylus tip 11 and stylus tip 25 may be softer with a wider circumference, for example, to more accurately imitate a human finger.

Figure 11:
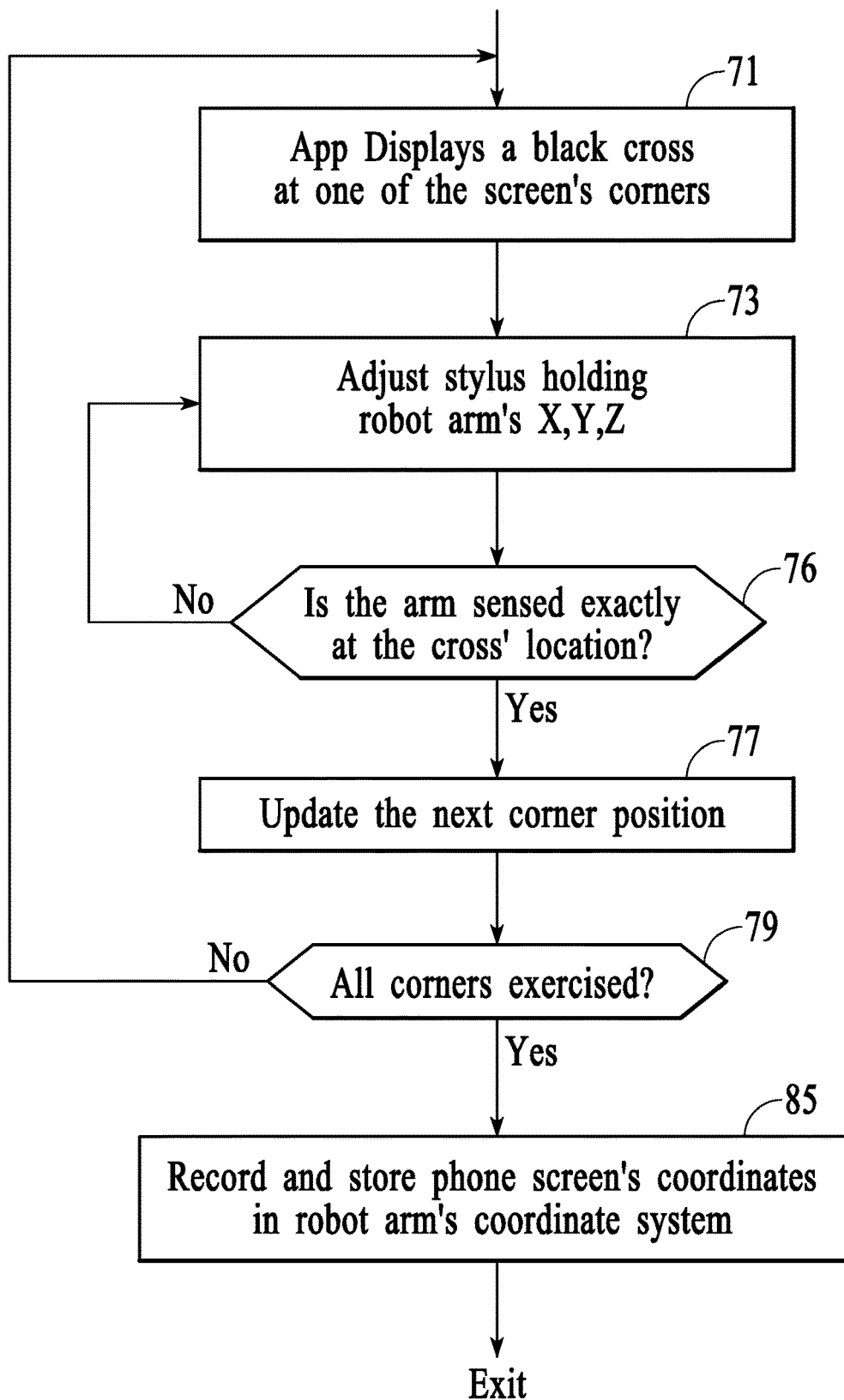
FIG. 11 is a simplified flow diagram that illustration calibration of robot arm coordinates for a mobile phone robot in accordance with an implementation.

FIG. 11 is a flow chart that illustrates logic used to calibrate movements of robot arm subsystem 20. In a step 71, an App running on mobile phone 103 will display a black cross at one of the corners of the touchscreen display of mobile phone 103. The robot arm controller direct stylus 11 or stylus 25 to be near the location of the displayed cross. In a step 73 and in a series of trial and correction steps 76, the stylus tip will finally be moved to the exact location of cross point. In a step 77, the cross will disappear and re-emerge at a different location on the touchscreen display. In a 79 step, a check is made as to whether all corners have been examined. If so, in a step 85, the mobile phone robot controller records the locations so that the robot arm controller knows the coordinates of the phone screen.

The mobile phone robot can assist a user to operate a mobile phone hands free via voice commands. The mobile display monitoring camera system is used, for example, to read the display screen of a mobile phone. After capturing the images displayed on the display screen of the mobile phone mobile display screen, computer vision and machine learning technology software are used to recognize the information displayed. Optical character recognition technology (OCR) is used to turn the texts displayed on the phone screen into actual texts. Through text-to-speech software running on main electronics circuit board 7, mobile phone robot communicates by a speaker to the user what is displayed on the screen. The mobile display monitoring camera system is also used by software running on main electronics circuit board 7 to locate fields that can be activated by touch.

For example, the computer vision and machine learning technology software runs on the electronic circuitry of the mobile phone robot. Alternatively, the computer vision and machine learning technology software is hosted external from the mobile phone robot. For example, the computer vision and machine learning technology software runs on the mobile phone or runs remotely on one or more cloud servers of cloud computing service providers. When the computer vision and machine learning technology software is hosted external from the mobile phone robot, the mobile phone robot transfers the image to the mobile phone through a wired or a wireless connection. For example, the wireless connection may be a Bluetooth connection, or a Wi-Fi connection. For example, the wired connection may be through a USB connection. For example, when the computer vision and machine learning technology software are located one or more cloud computing service providers accessible by the Internet, the mobile phone robot transfers the image through the mobile phone to one or more cloud computing service providers or the mobile phone robot transfers the image to one or more cloud computing service providers accessible by the Internet using a wireless interface such as a 4G/5G wireless data interface, a Wi-Fi interface or another type of wireless interface.

Figure 12:
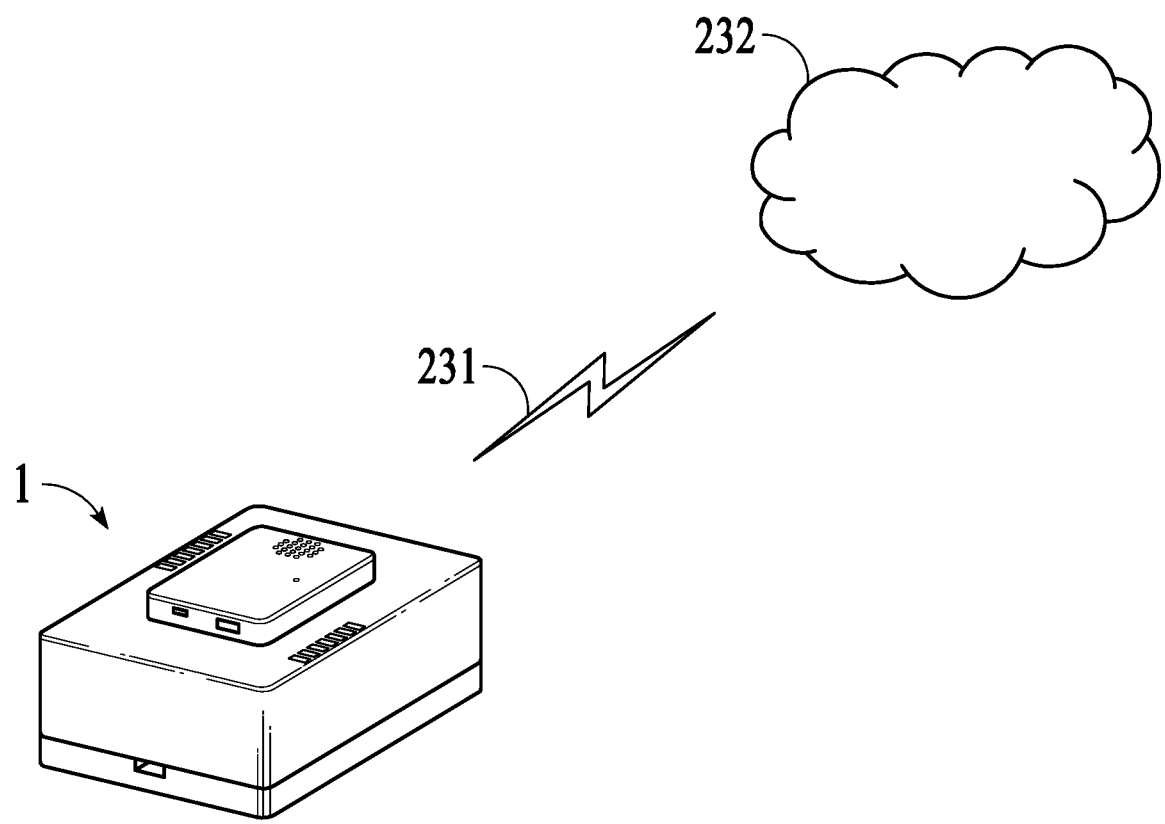
FIG. 12 is a simplified flow diagram that a mobile phone robot communicating remotely through the Internet to a cloud server of a cloud computing service provider in accordance with an implementation.

This is illustrated in FIG. 12 where mobile phone robot 1 sends captured a phone screen image to a cloud server 232 via a 4G/5G wireless link 231. After processing, the control commands along with the recognized text and voice are returned to mobile phone robot 1 via 4G/5G wireless link 231 for controlling the robot arms and producing a synthesized voice through the speaker of mobile phone robot 1.

For example, the mobile phone robot controlled by software running on main electronics circuit board 7 uses a microphone to capture commands from the user, and uses a speech-to-text software technology to perform speech-to-text operations. The commands can be entered via interaction with the touchscreen display or keyboard of the mobile phone, using robot arm subsystems 20, wireless communication (e.g., using Bluetooth or WiFi technology) or using some combination of robot arm subsystems 20 and wireless communication.

The mobile phone robot allows a versatile way to allow a user to communicate hands free with a mobile phone. The communication includes performing multi-touch entries to a mobile phone.

Although the present invention has been described in accordance with the embodiments shown, one of ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A mobile phone robot that allows a user to operate a mobile phone hands free via voice commands, the mobile phone robot, comprising:
   a fastener that holds a mobile phone stationary relative to the mobile phone robot;
   a first robot arm subsystem that controls location and timing of contact of a first stylus tip with a touchscreen or a keyboard of the mobile phone;
   a second robot arm subsystem that controls location and timing of contact of a second stylus tip with a touchscreen or a keyboard of the mobile phone;
   a camera subsystem oriented to capture images displayed by the mobile phone;
   a speaker by which the mobile phone robot communicates to a user what is shown in the images displayed by the mobile phone as captured by the camera subsystem;
   a microphone that receives commands from the user; and,
   control circuitry that controls the first robot arm subsystem and the second robot arm subsystem, the control circuitry processing the images captured by the camera subsystem to detect text displayed within the images that the mobile phone robot communicates to the user using the speaker;
   wherein the control circuitry performs speech to text translation of the commands received from the user in order to perform touch operations on the mobile phone that are executed by the first robot arm subsystem and the second robot arm subsystem.

2. A mobile phone robot as in claim 1, additionally comprising a motor placed on a side of the mobile phone that rotates a shaft to depress a button on the side of the mobile phone.

3. A mobile phone robot as in claim 1, additionally comprising:
   a motor placed on a side of the mobile phone that rotates a shaft to depress a button on the side of the mobile phone, position of the motor relative to the mobile phone being adjustable.

4. A mobile phone robot as in claim 1, additionally comprising:
   a first motor used to depress a first button on a first side of the mobile phone; and,
   a second motor used to depress a second button on a second side of the mobile phone, the first side being opposite the second side.

5. A mobile phone robot as in claim 1, additionally comprising a motor placed on a side of the mobile phone that rotates an elliptical shape to depress a button on the side of the mobile phone.

6. A mobile phone robot as in claim 1, wherein software running on the control circuitry uses the images captured by the camera subsystem to configure movement of the first robot arm subsystem and the second robot arm subsystem.

7. A mobile phone robot as in claim 1, wherein software running on the control circuitry uses the images captured by the camera subsystem to determine locations of corners of a display of the mobile phone, the locations of corners of the display of the mobile phone being used to configure movement of the first robot arm subsystem and the second robot arm subsystem.

8. A mobile phone robot as in claim 1, wherein software running on a cloud server uses the images captured by the camera subsystem to configure movement of the first robot arm subsystem and the second robot arm subsystem.

9. A mobile phone robot as in claim 1, wherein software running on a cloud server uses the images captured by the camera subsystem to determine locations of corners of a display of the mobile phone, the locations of corners of the display of the mobile phone being used to configure movement of the first robot arm subsystem and the second robot arm subsystem.

10. A method by which a mobile phone robot allows a user to operate a mobile phone hands free via voice commands, the method, comprising:
    holding a mobile phone stationary relative to the mobile phone robot;
    using a first robot arm subsystem to control location and timing of contact of a first stylus tip with a touchscreen or a keyboard of the mobile phone;
    using a second robot arm subsystem to control location and timing of contact of a second stylus tip with a touchscreen or a keyboard of the mobile phone;

using a camera subsystem to capture images displayed by the mobile phone;
using a speaker by the mobile phone robot to communicate to a user what is shown in the images displayed by the mobile phone as captured by the camera subsystem;
using a microphone by which the user gives commands to the mobile phone robot; and
using control circuitry to control the first robot arm subsystem and the second robot arm subsystem, including:
  processing the images captured by the camera subsystem to detect text displayed within the images that is that the mobile phone robot to the user using the speaker, and
  performing speech to text translation of the commands received from the user to perform touch operations on the mobile phone that are executed by the first robot arm subsystem and the second robot arm subsystem.

11. A method as in claim 10, additionally comprising:
positioning a motor on a side of the mobile phone so that rotating a shaft depresses a button on the side of the mobile phone.

12. A method as in claim 10, additionally comprising:
positioning a first motor on a first side of the mobile phone so as to allow movement of the motor to depress a first button on the first side of the mobile phone; and,
positioning a second motor on a second side of the mobile phone so as to allow movement of the motor to depress a second button on the second side of the mobile phone.

13. A method as in claim 10, additionally comprising:
positioning a motor on a side of the mobile phone so that rotating an elliptical shape depresses a button on the side of the mobile phone.

14. A method as in claim 10, additionally comprising:
using the images captured by the camera subsystem to configure movement of the first robot arm subsystem and the second robot arm subsystem.

15. A method as in claim 10, additionally comprising:
using the images captured by the camera subsystem to configure movement of the first robot arm subsystem and the second robot arm subsystem, including:
  using the images captured by the camera subsystem to determine locations of corners of a display of the mobile phone, the locations of corners of the display of the mobile phone used to configure movement of the first robot arm subsystem and the second robot arm subsystem.

16. A method as in claim 10, additionally comprising:
using the images captured by the camera subsystem to configure movement of the first robot arm subsystem and the second robot arm subsystem, including:
  using the camera subsystem to capture a calibration image displayed by the mobile phone,
  moving the first stylus tip held by the first robot arm subsystem toward a first predetermined location on a display of the mobile phone,
  using the camera subsystem to determine whether the first stylus tip reached the first predetermined location,
  when the camera subsystem determines the first stylus tip has not reached the first predetermined location, use feedback information from the camera subsystem to continue moving the first stylus tip held by the first robot arm subsystem toward the first predetermined location on a display of the mobile phone,
  when the camera subsystem determines the first stylus tip has reached the first predetermined location, noting coordinates of the first predetermined location;
  moving the first stylus tip held by the first robot arm subsystem toward a second predetermined location on a display of the mobile phone,
  using the camera subsystem to determine whether the first stylus tip reached the second predetermined location,
  when the camera subsystem determines the first stylus tip has not reached the second predetermined location, use feedback information from the camera subsystem to continue moving the first stylus tip held by the first robot arm subsystem toward the second predetermined location on a display of the mobile phone, and
  when the camera subsystem determines the first stylus tip has reached the second predetermined location, noting coordinates of the second predetermined location.

17. A method as in claim 16, wherein the first predetermined location is located on a first corner of the display and wherein the second predetermined location is located on a second corner of the display.

18. A method to configure a mobile phone robot able to perform multi-touch operations on a mobile phone, method comprising:
holding a mobile phone stationary relative to the mobile phone robot; and
performing a process using feedback from a camera system to calibrate the mobile phone robot including:
  using the camera subsystem to capture a calibration image displayed by the mobile phone;
  moving a stylus tip held by a first robot arm subsystem toward a first predetermined location on a display of the mobile phone;
  using the camera subsystem to determine whether the stylus tip reached the first predetermined location;
  when the camera subsystem determines the stylus tip has not reached the first predetermined location, use feedback information from the camera subsystem to continue moving the stylus tip held by the first robot arm subsystem toward the first predetermined location on a display of the mobile phone;
  when the camera subsystem determines the stylus tip has reached the first predetermined location, noting coordinates of the first predetermined location;
  moving the stylus tip held by the first robot arm subsystem toward a second predetermined location on a display of the mobile phone;
  using the camera subsystem to determine whether the stylus tip reached the second predetermined location;
  when the camera subsystem determines the stylus tip has not reached the second predetermined location, use feedback information from the camera subsystem to continue moving the stylus tip held by the first robot arm subsystem toward the second predetermined location on a display of the mobile phone; and
  when the camera subsystem determines the stylus tip has reached the second predetermined location, noting coordinates of the second predetermined location.

19. A method as in claim 18, wherein the first predetermined location is located on a first corner of the display and wherein the second predetermined location is located on a second corner of the display.

* * * * *